Oct. 12, 1926.

W. A. MATHESON

CASTER

Filed May 11, 1923   2 Sheets-Sheet 1

1,602,919

Witnesses:
W. F. Kilroy
Harry R. L. White

Inventor:
William A. Matheson
By
Attys

Oct. 12, 1926.  1,602,919
W. A. MATHESON
CASTER
Filed May 11, 1923    2 Sheets-Sheet 2
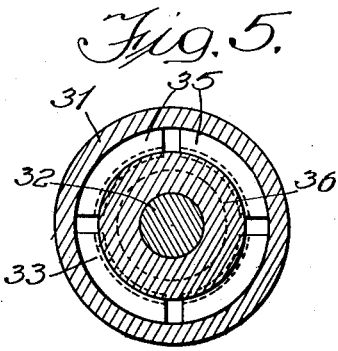
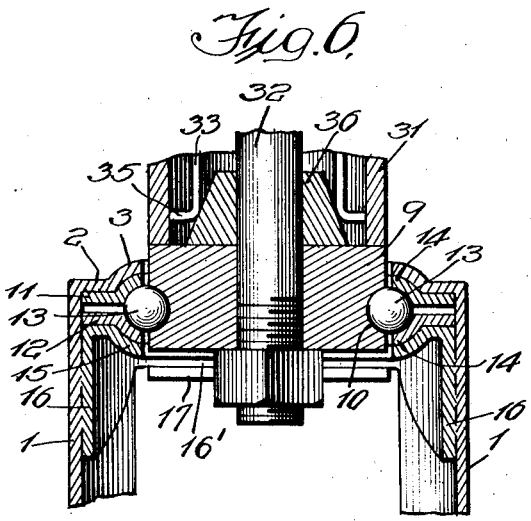
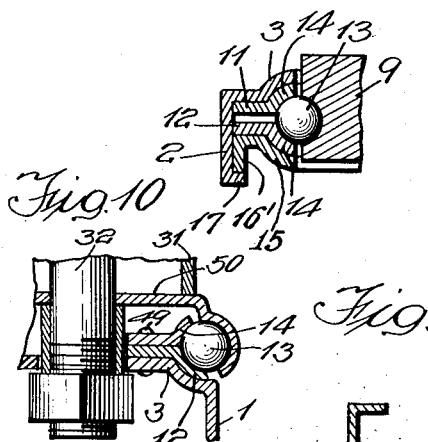
Witnesses:
W. F. Kilroy
Harry R. L. White
Inventor:
William A. Matheson
By Patented Oct. 12, 1926.

1,602,919

UNITED STATES PATENT OFFICE.

WILLIAM A. MATHESON, OF CHICAGO, ILLINOIS, ASSIGNOR TO ROLL-A-WAY BED CORPORATION, OF CHICAGO, ILLINOIS, A CORPORATION OF ILLINOIS.

CASTER.

Application filed May 11, 1923. Serial No. 638,178.

My invention belongs to that general class of devices known as casters, and relates particularly to an anti-friction caster adapted for many uses.

The invention has among its objects the production of a device of the kind described which is simple, compact, durable, attractive, efficient and satisfactory for use wherever found applicable.

It has particularly as an object the production of a caster that will swivel easily as well as roll easily, which will be noiseless and not injure floors, which is extremely rigid and strong and which will be securely attached to the device upon which it is to be used.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 5 is a sectional view taken substantially on line 5—5 of Fig. 2;

Fig. 6 is an enlarged sectional view taken substantially on line 6—6 of Fig. 1;

Fig. 7 is a detailed sectional view illustrating the fork construction;

Fig. 8 is an enlarged sectional view illustrating the tire and wheel construction;

Fig. 9 is a sectional view illustrating a modified type of wheel bearing construction; and Fig. 10 illustrates a modified form of swivel bearing.

Figure 1:
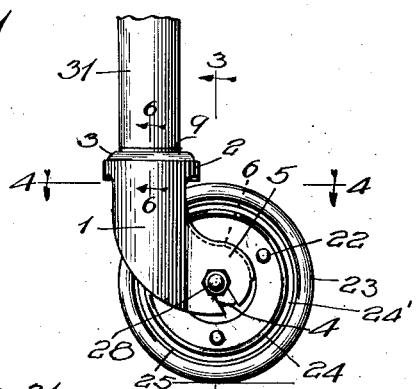
Fig. 1 is a side elevation of my improved caster.
Figure 2:
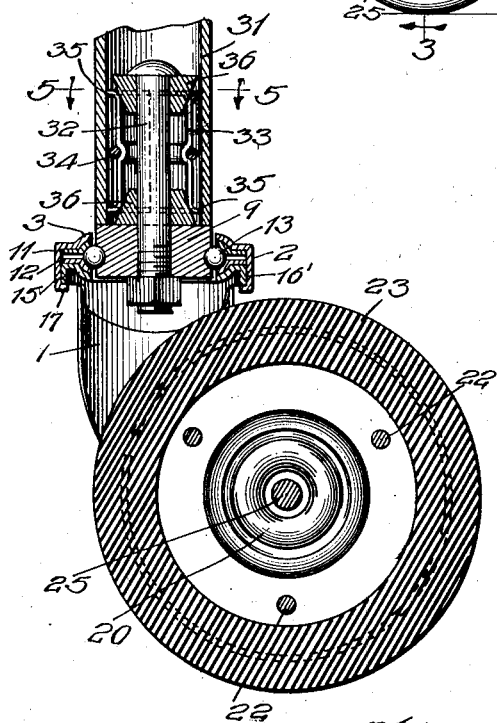
Fig. 2 is a sectional view taken substantially on line 2—2 of Fig. 3.
Figure 4:
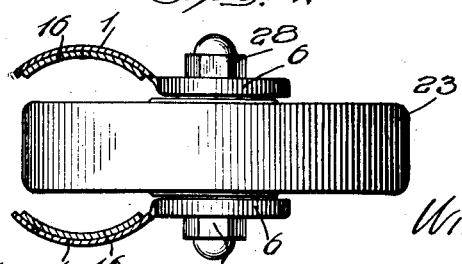
Fig. 4 is a sectional view taken substantially on line 4—4 of Fig. 1.

Referring to the drawings, in which the preferred embodiments of my invention are shown, there is provided a fork member 1 consisting of the two side legs connected at their upper end by the flange member 2 which is preferably flanged inwardly as indicated at 3 and arranged to cooperate with one of the bearing race way portions hereinafter described. The fork member is preferably constructed as most clearly shown in Figs. 1 and 4, with the parts substantially curved or semi-cylindrical in horizontal cross-section so as to afford an attractive appearance as well as secure great strength and stiffness.

The parts 1 are each extended as indicated at 5, the extended parts 5 being reinforced or strengthened and stiffened by flanges 6 or the equivalent, which also add to the attractiveness of the same. The fork members are provided with openings or apertures 4 therethrough, arranged to receive the wheel or caster axle as will be hereinafter described, open ended slots being shown for purposes of illustration.

The fork may be made of a stamping, which may not only be economically manufactured by suitable dies, but is also of great strength notwithstanding the fact that it is of comparatively light weight. The top flange part 2 is provided with an opening of a size to receive a bearing member 9 which carries the structure upon which the caster is mounted as I shall hereinafter refer.

The member 9 is provided with a ball race 10 or the equivalent, in which anti-friction devices as for example balls 13 are mounted, 11 and 12 being cooperating bearing or ball-races, and preferably constructed in the form of a stamping and hardened so as to afford long life with a minimum of wear. The members 11 and 12 are maintained in position by a retaining member 15, which I prefer to construct with the flange portions 16 which may be brazed or soldered or otherwise secured to the fork members 1, thereby greatly reinforcing the same at the top.

As most clearly shown in Fig. 7, the flange 2 of the fork portion 1 may be flanged inwardly as indicated at 17 so as to engage the flange 16' on the member 15, whereby when the parts are assembled they are all securely locked in place and it is impossible to accidentally loosen the bearing parts. Obviously, any weight on the member 9 is carried by the fork through the ball bearings or their equivalents, and the caster may swivel easily even when carrying a heavy load.

The fork is provided with a wheel of suitable size and construction, that shown consisting of stamped plates 18—18, which may be secured together by rivets or the equivalent 22, or spot-welded together, thus affording a very strong and rigid construction. The same is formed at the hub or axle as indicated at 19 and 20, so as to provide races for anti-friction members, balls 27 being shown for the purpose.

The axle 25 carries nuts 26, which cooperating with the balls, form races therefor, the balls being securely maintained against accidental displacement and loss. The nuts 26 may be adjusted as desired, after which cap nuts 28 may be positioned, adding to the appearance and also locking the ends of the forks tightly to the axle.

Figure 3:
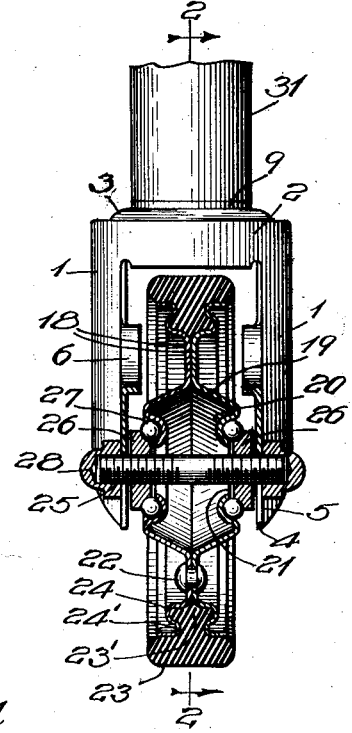
Fig. 3 is a sectional view taken substantially on line 3—3 of Fig. 1.

As most clearly shown in Figs. 3 and 8, the wheel at the rim is constructed with the plates 18 flared as indicated at 24, and thence brought together as indicated at 24', and thence outwardly flared as at 25 to form a good bearing or support for the tire, 23 being a suitable tire of rubber or the like which I prefer to form with a bead 23' adapted to be locked in place by the rim of the wheel. The tire is mounted on one of the plates 18 and thence the other plate applied, and then the two are secured together as mentioned, thereby locking the tire on the wheel. It is practically impossible to loosen the tire from the wheel, and owing to the anti-friction bearings on the wheel and swivel, there is practically no wear on the tire at any time, the same therefore having great durability and long life.

Referring to Figs. 1, 2 and 5, 31 represents a leg or the like adapted to be mounted upon the caster and be supported thereby. The caster is secured to the leg in such a manner that it cannot drop out and become lost, and so that it will fit tightly regardless of variations in the size of the leg. As shown, 32 is a bolt which projects up through the part 9 and carries expansion members 36—36 adapted to cooperate with the expansion sleeve members 33.

I have shown the sleeve in a plurality of parts, the same being normally maintained together or in assembled relation with the members 36 by means of a spring ring or sleeve 34 or the like. These expansion sleeve members are preferably constructed with projecting parts 35 adapted to fit the inner wall of the tubular leg 31, whereby when the bolt is tightened up the expansion members 36 will be drawn together, thereby expanding the members 33 against the leg 31, locking the caster in place.

In a slightly modified construction shown in Fig. 9, 39 represents the fork portions and 40—40 the wheel plates suitably secured together. In this particular construction, the wheel is formed as at 41 at the hub and as at 42—43, so as to provide ball races thereat, 44 being a nut having a flange 45 adapted to form the cooperating part of the race. These are mounted on the axle 47 similar to the other construction, and the cap nuts 48 are preferably arranged as shown. The construction is substantially similar in operation to that shown in Fig. 3.

In the modification shown in Fig. 10 the top web 3 of the fork may be formed with an external groove along its periphery and in which the race ring 12 seats. The ring 14 cooperates with the ring 12 and may be secured thereto by any suitable means, as by rivets 49 to form the inner raceway to receive the balls 13. An outer raceway or cup 50 is arranged as shown, and the bolt 32 is used to secure the caster to the bed post 31.

From the preceding, it will be seen that my improved caster is not only exceedingly attractive in appearance, but that it is simple, of great strength and rigidity notwithstanding its lightness in weight, and that it is operable substantially without friction. The same is particularly adapted for use on folding beds and other articles of furniture of some weight, but it is also particularly suitable for invalids' chairs, trucks and numerous other places where the same is applicable. It is to be understood that some of the parts shown as stampings may be cast if found preferable.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the kind described and in combination, a bracket comprising a pair of spaced legs of arcuate cross-section connected across their upper ends by a circular web apertured to receive a swivel bearing thereat, the lower ends of the legs extended laterally of the upper portion and being substantially flat, a flange arranged along the upper edges of said last-mentioned flat portions adjoining the side edges of the said upper portions of arcuate cross section, and said flat portions having axle-receiving openings.

2. In a device of the class described and in combination, a bracket comprising a pair of legs connected across their upper ends by a circular web having a central opening, a roller wheel mounted at the lower end of the pair of legs, a swivel bearing adjacent the central opening of the circular web, and means for holding the swivel bearing to the bracket, said means including portions on said circular web between the spaced legs of the bracket bent radially inward to engage a part of the swivel bearing at the under side thereof.

3. In a caster, a bracket-fork, a wheel arranged at one end between the prongs of the fork, a pair of annular grooved members secured at the other end of said bracket, an annular member coaxial with and engaging one of said first-mentioned annular members and having ears adapted to be welded to the prongs of the bracket, said bracket having the portion at the upper end intermediate the prongs bent over the lower edge of said last-mentioned annular member to clamp it against said pair of annular members, and a hardened block arranged centrally of said annular member and having a groove on its periphery to cooperate with the grooves of the first-mentioned annular members to receive ball members therein.

4. In a device of the class described, and in combination, a bracket comprising a pair of legs connected across their upper ends by a circular web having a central opening, a roller wheel mounted at the lower end of the pair of legs, a swivel block disposed within the central opening of the circular web, and an anti-friction bearing interposed between the swivel block and the interior of the circular web, said web having an inwardly extending flange at its upper part overlying said anti-friction bearing, and the web having portions between the spaced legs of the bracket bent radially inward to engage a part of the anti-friction bearing at the under side thereof, said flange and said portions serving as retaining means for the anti-friction bearing and swivel block.

5. In a device of the class described and in combination, a bracket comprising a pair of legs of arcuate cross section connected across their upper ends by a circular web having a central opening, a swivel block disposed within the central opening of the web, an anti-friction bearing interposed between the swivel block and the inner face of the circular web, and means for reinforcing the bracket and for holding the said anti-friction bearing and swivel block to the bracket including an annular member arranged coaxially with and engaging a part of the anti-friction bearing, said annular member having spaced oppositely disposed depending portions of a cross sectional shape and width corresponding to that of the pair of legs to fit against the inner faces thereof and being secured thereto.

In testimony whereof, I have hereunto signed my name.

WILLIAM A. MATHESON.